United States Patent [19]

Brenholt et al.

[11] Patent Number: 4,693,663

[45] Date of Patent: Sep. 15, 1987

[54] ROBOT WITH ARTICULATED ARM

[75] Inventors: David L. Brenholt; Stephen M. Crane; Paul M. Fischer; Kenneth V. Mattson, all of Menomonie, Wis.

[73] Assignee: Donaldson Company, Inc., Minneapolis, Minn.

[21] Appl. No.: 658,267

[22] Filed: Oct. 5, 1984

[51] Int. Cl.$^4$ .............................................. B25J 9/06
[52] U.S. Cl. ...................................... 414/735; 901/15; 901/21; 901/22
[58] Field of Search ..................... 414/730, 695.5, 735; 901/14, 15, 30, 9, 37, 21, 22

[56] References Cited

U.S. PATENT DOCUMENTS

| 4,339,984 | 7/1982 | Huhne | 901/9 X |
| 4,356,554 | 10/1982 | Susnjara et al. | 901/15 X |
| 4,378,836 | 4/1983 | Moussault | 901/14 X |
| 4,378,959 | 4/1983 | Susnjara | 901/15 X |
| 4,396,344 | 8/1983 | Sugimoto et al. | 901/15 X |
| 4,496,278 | 1/1985 | Kaise | 901/21 X |
| 4,531,885 | 7/1985 | Molaug | 901/21 X |

FOREIGN PATENT DOCUMENTS 858421 4/1957 United Kingdom ............. 414/695.5

OTHER PUBLICATIONS

U.S. Dept. of Commerce, Industrial Robots, Aug., 1982.
Pendar Robotics Ltd., Pendar Placemate Brochure (undated).

Primary Examiner—Frank E. Werner
Assistant Examiner—Donald W. Underwood
Attorney, Agent, or Firm—Merchant, Gould, Smith, Edell, Welter & Schmidt

[57] ABSTRACT

A hybrid robot (10) for industrial applications comprises an articulated arm assembly (12) pivoted to a turntable assembly (14) mounted for rotation on a base assembly (16). The arm assembly (12) includes an upper arm (26) pivoted to a lower arm (30). A tool adaptor (52) is connected to the upper arm (26) by a wrist assembly (54). A pantograph linkage interconnects the wrist assembly (54), upper arm (26), and lower arm (30) so that the tool adaptor is normally maintained in constant orientation during movement of the arm assembly (12), subject to overriding control by actuators (122, 124). Pivotal movement of the arm assembly (12) is controlled by independent actuators (118, 120) which can be selectively coupled to the arms (26, 30) at different combinations of predetermined points (38, 40, 44, 46, 48) to facilitate adjustment of the work envelope. The turntable assembly 14 is controlled by a brake assembly (202-216) responsive to an encoder (180) for positioning at the arc extremes and at least one intermediate position.

7 Claims, 12 Drawing Figures

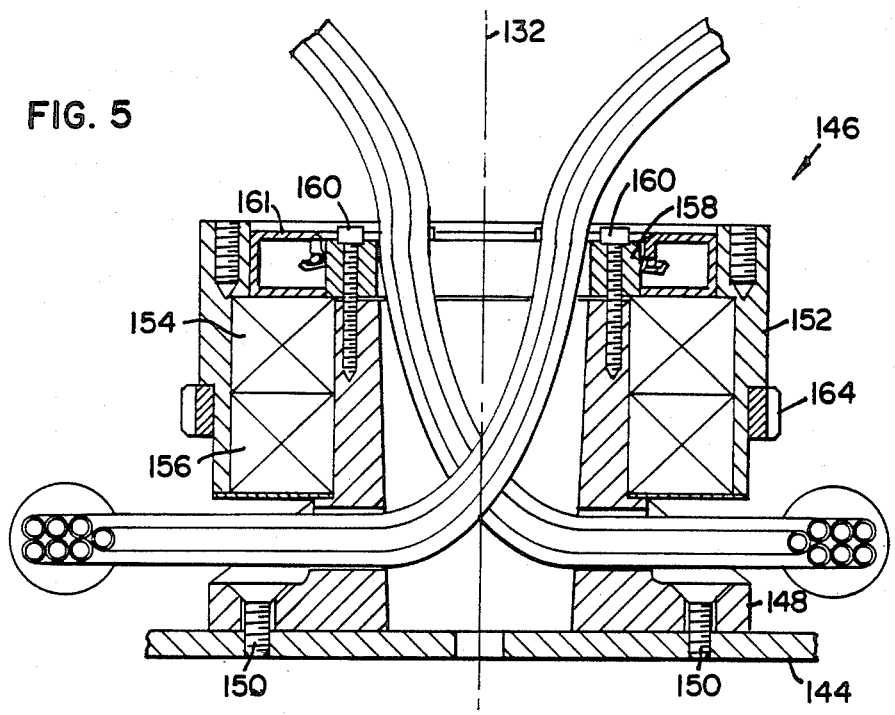
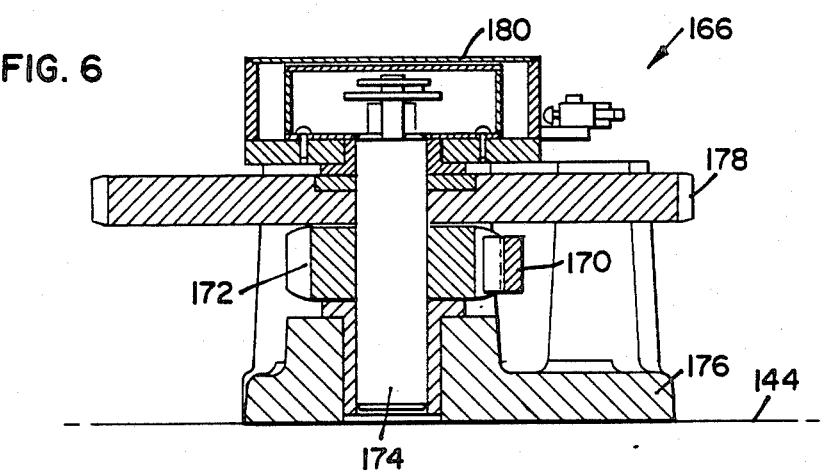

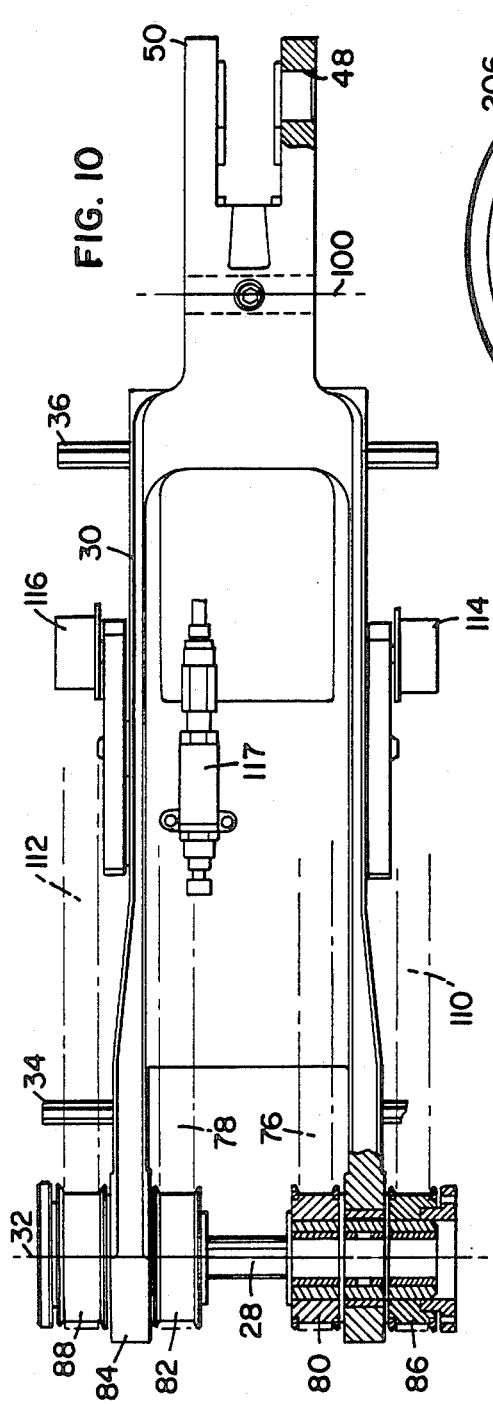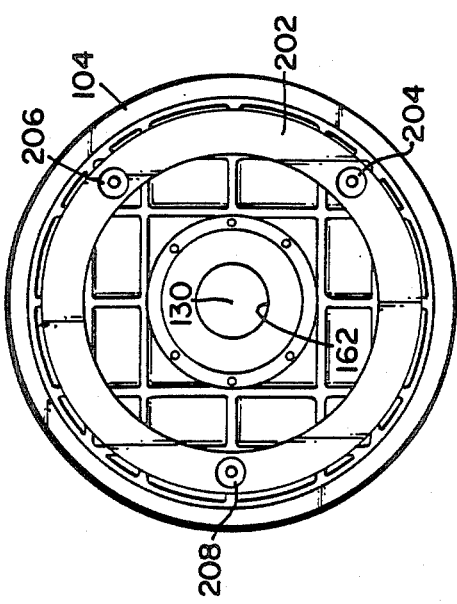

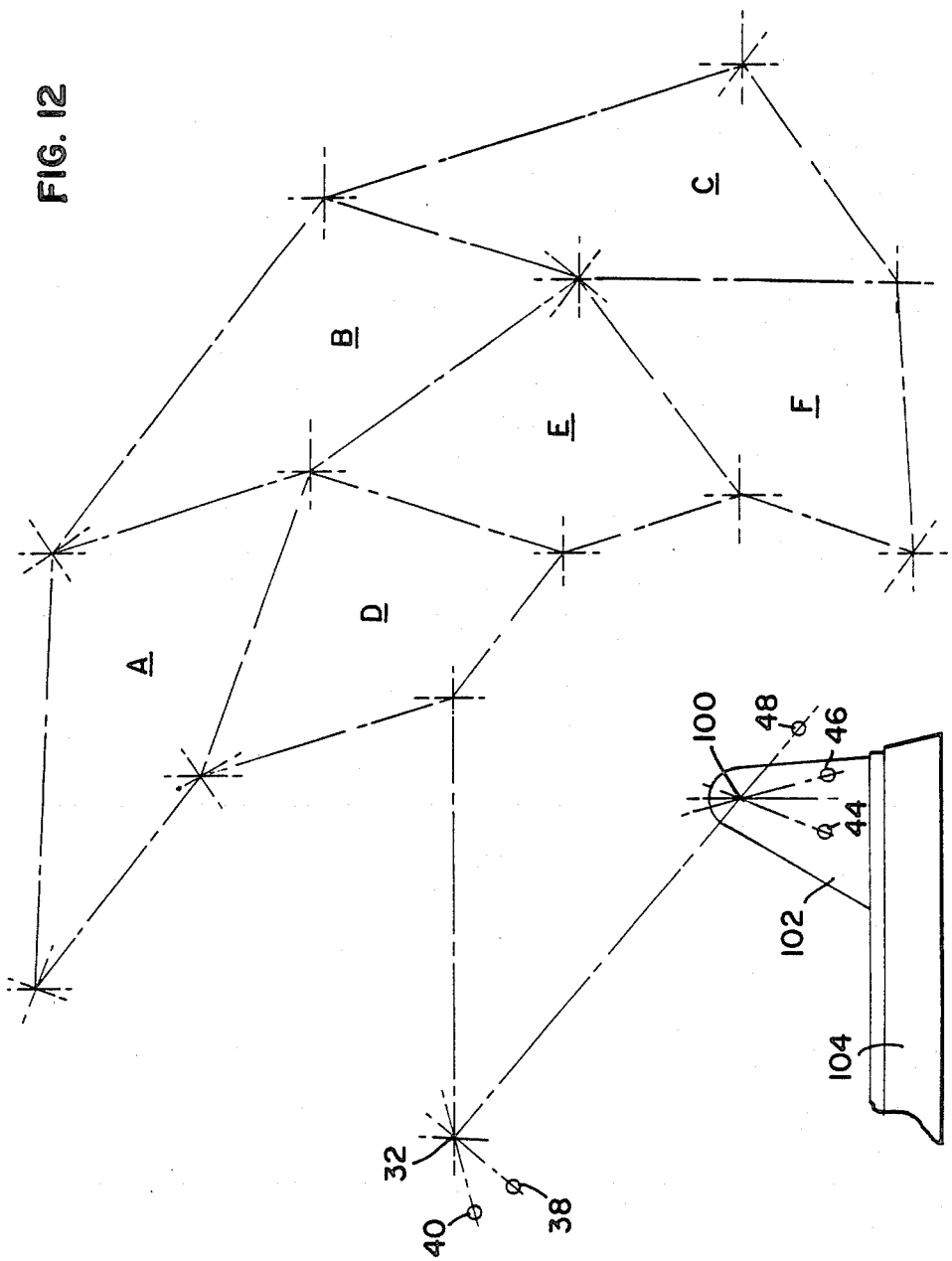

4,693,663

ROBOT WITH ARTICULATED ARM

TECHNICAL FIELD

The present invention relates generally to robotics or programmable machines. More particularly, this invention pertains to a hybrid robot having an articulated arm which is primarily adapted for use as a servo device but which can easily be converted for use as a non-servo device.

BACKGROUND ART

There has been increasing emphasis on the application of robotics technology to various industrial uses. The Robot Institute of America defines a robot as a "Reprogrammable, multi-functional manipulator designed to move materials, parts, tools, or specialized devices through various programmed motions for the performance of a variety of tasks". The field of robotics is a rapidly developing area of technology.

In general, there are two main types of robots. The digital or non-servo type of robot is typically actuated by fluid cylinders and is characterized by on/off operation. The other type is servo robots, also known as analog or proportional robots, which can be actuated by fluid cylinders or electrical actuators and are characterized by usage of a feedback signal for control purposes. In addition, there are various classes of both types of these robots, depending upon their degree of intelligence. Those types of robots which combine characteristics of the servo and non-servo types are generally known as hybrid robots.

The pick-and-place robot is a type of non-servo robot which utilizes double-acting cylinders, usually pneumatic, each having only extended or retracted positions such that their operation is characterized by an on/off or digital function. Most such robots are based on a fairly simple set of X, Y, and Z axes set perpendicualr to each other so that their arms tend to operate on cylindrical or Cartesian coordinate systems. As a result, such robots tend to be of limited use and must be custom-adapted to particular operations. Further, such robots cannot be readily adapted to perform other operations and are thus difficult to reprogram without extensive mechanical adjustments. Heretofore such robots have not utilized articulated arms.

A need has thus arisen for an improved pick-and-place robot incorporating an articulated arm which is adapted to facilitate reprogrammability by changing the operating envelope.

SUMMARY OF INVENTION

The present invention comprises an improved robot which overcomes the foregoing and other difficulties associated with the prior art. In accordance with the invention, there is provided a hybrid robot having an articulated arm and other features which facilitate reprogramming for operation in one of a plurality of other predetermined operational envelopes.

The robot herein comprises an articulated arm assembly pivoted on a turntable assembly supported for rotation on a stationary base assembly. The articulated arm assembly includes upper and lower pivotal arms. An adaptor is provided at the outer end of the upper arm for receiving a tool such as a gripper or the like. The adaptor is mounted on a wrist assembly for pivotal movement about longitudinal and lateral axes relative to the upper arm to provide pitch-and-roll in the fashion of a wrist. The upper and lower arms are pivotal relative to each other and relative to the turntable assembly about two lateral axes by means of two separate linear actuators which are coupled to their respective arms by means of a plurality of predetermined releasable pin connections to provide different operating envelopes. Movement of the wrist assembly is controlled by another pair of separate linear actuators through a linkage, which is preferably a pantograph-type linkage so that orientation of the adaptor relative to the arms is constant unless overridden by the adaptor control actuators.

The turntable assembly and the articulated arm assembly mounted thereon are supported by the stationary base assembly for partial rotational movement about an upright axis so that the robot has five total axes of motion. A drive assembly including another linear actuator is provided in the base assembly for controlling rotation of the turntable assembly. A brake assembly, which is responsive to a rotary encoder coupled to the drive assembly, is also provided for defining a plurality of predetermined intermediate rotational positions of the turntable assembly between predetermined arc limits. In the preferred embodiment, double-acting fluid cylinders are utilized for the linear actuators, although servo actuators can be substituted to adapt the robot from a non-servo device to a servo device.

BRIEF DESCRIPTION OF DRAWINGS

A better understanding of the invention can be had by reference to the following Detailed Description in connection with the accompanying Drawings, wherein:

FIG. 5 is an enlarged view of the main support of the stationary base assembly taken along lines 5—5 of FIG. 4 in the direction of the arrows;

FIG. 6 is an enlarged sectional view of the rotational drive of the base assembly taken along lines 6—6 of FIG. 4 in the direction of the arrows;

FIG. 7 is a bottom view of the turntable assembly;

FIG. 10 is a top view (partially cutaway) of the lower arm of the articulated arm assembly;

FIG. 12 is a diagram of the operating envelopes which can be obtained with the articulated arm assembly of the invention at any rotational position of the turntable assembly.

DETAILED DESCRIPTION

Figure 1:
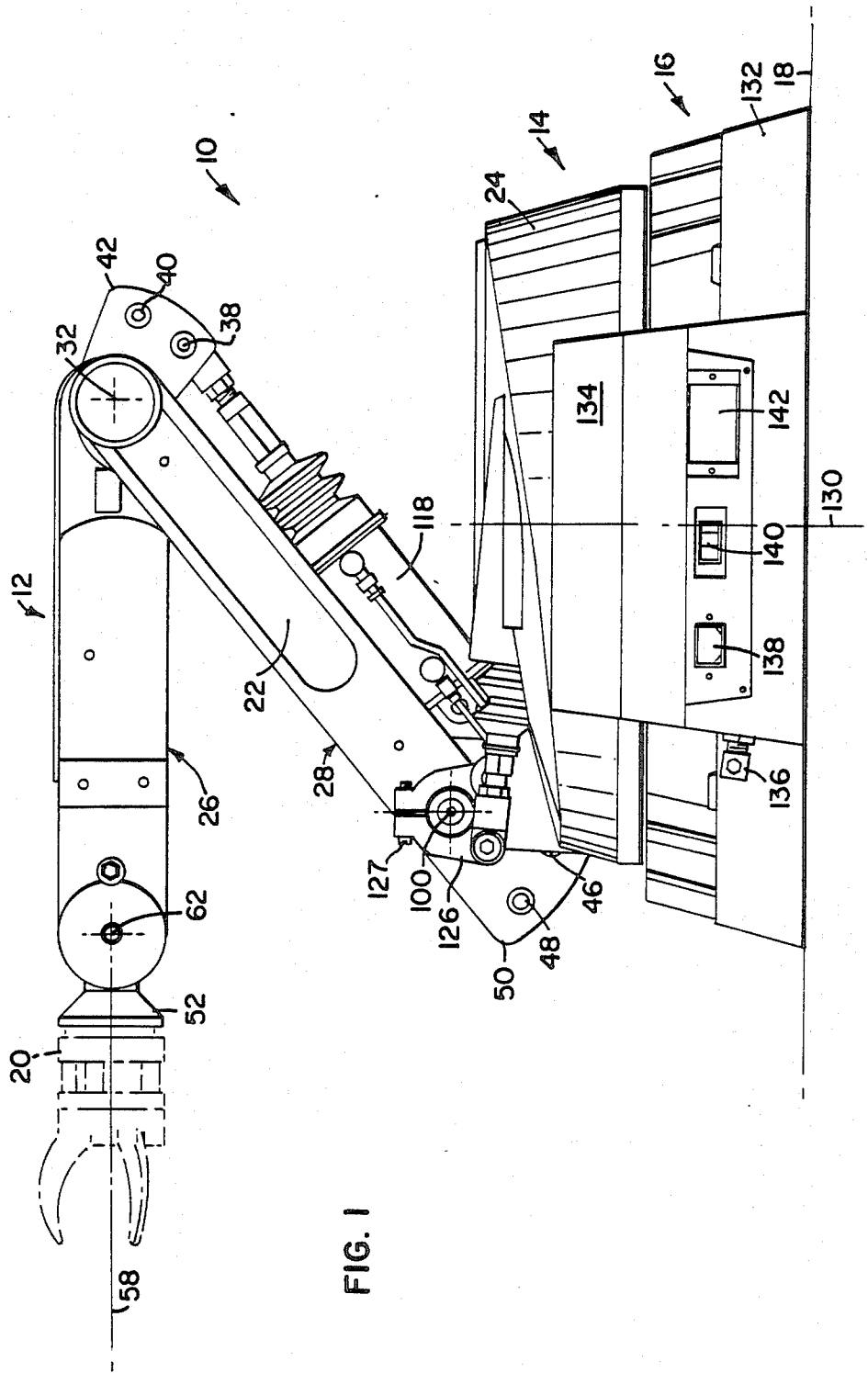
FIG. 1 is a side view of the hybrid robot of the invention.
Figure 2:
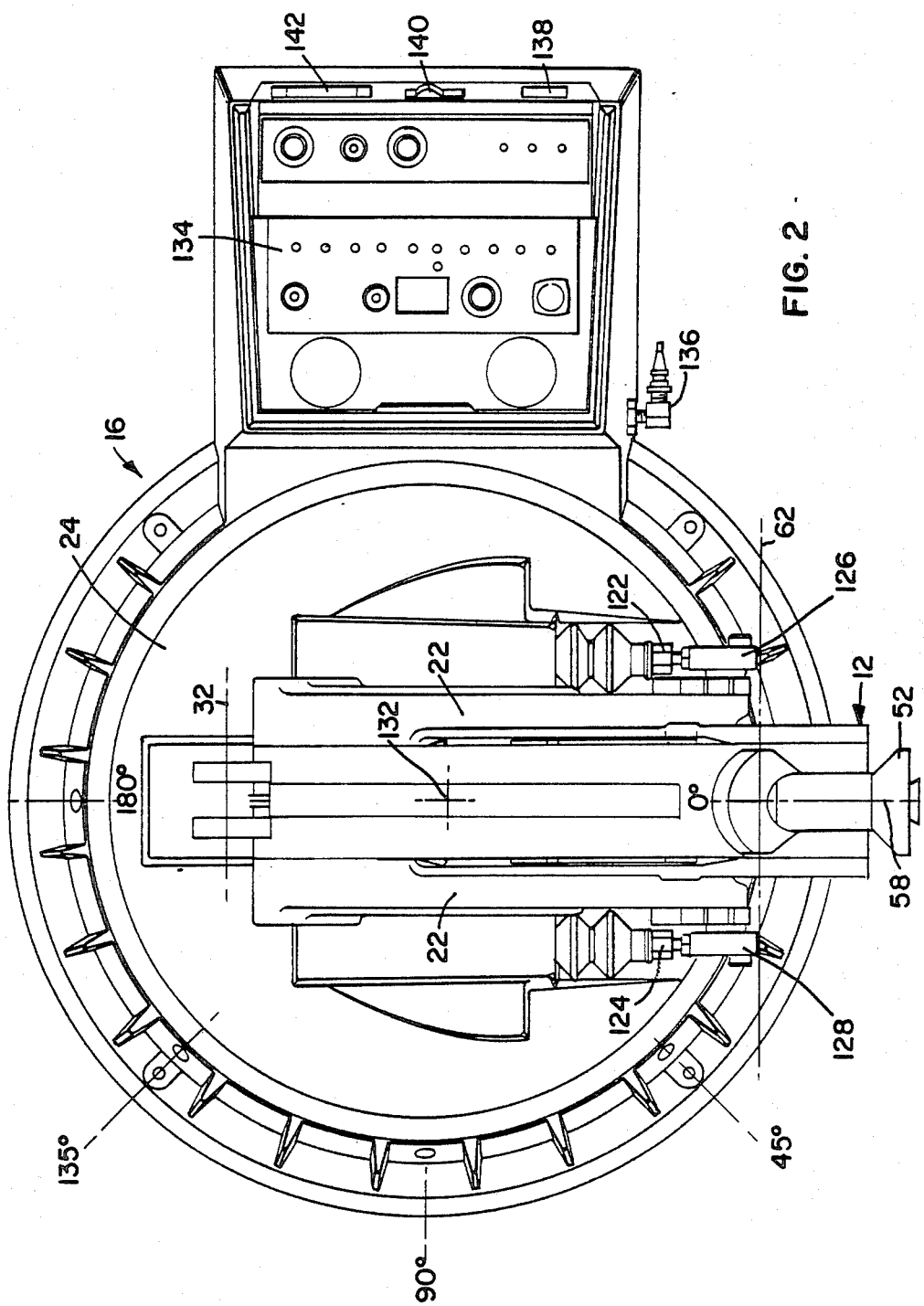
FIG. 2 is a top view of FIG. 1.

Referring now to the Drawings, wherein like reference numerals designate like or corresponding elements throughout the views, and particularly referring to FIGS. 1 and 2, there is shown the robot 10 of the invention. The robot 10 comprises an articulated arm assembly 12 mounted on a turntable assembly 14 supported for rotation on a stationary base assembly 16 which is secured to a suitable platform 18. The platform 18 can be stationary or movable depending upon the application of the robot 10. A tool 20, such as the fluid-actuated gripper shown in phantom lines in FIG. 1, is mounted at the upper end of the articulated arm assembly 12, which is mounted at its lower end for pivotal movement on the turntable assembly 14. The turntable assembly is supported by the base assembly 16 for rotation between 0° and 180° as shown in FIG. 2. A pair of covers 22 are provided on opposite sides of the arm assembly 12 for safety purposes. Similarly, a protective cover 24 is provided on the turntable assembly 14. As will be explained more fully hereinafter, the robot 10 is a hybrid device which is primarily adapted for use as a non-servo robot, with extended flexiblity and capability of upgrading to a full five-axis servo device.

Figure 11:
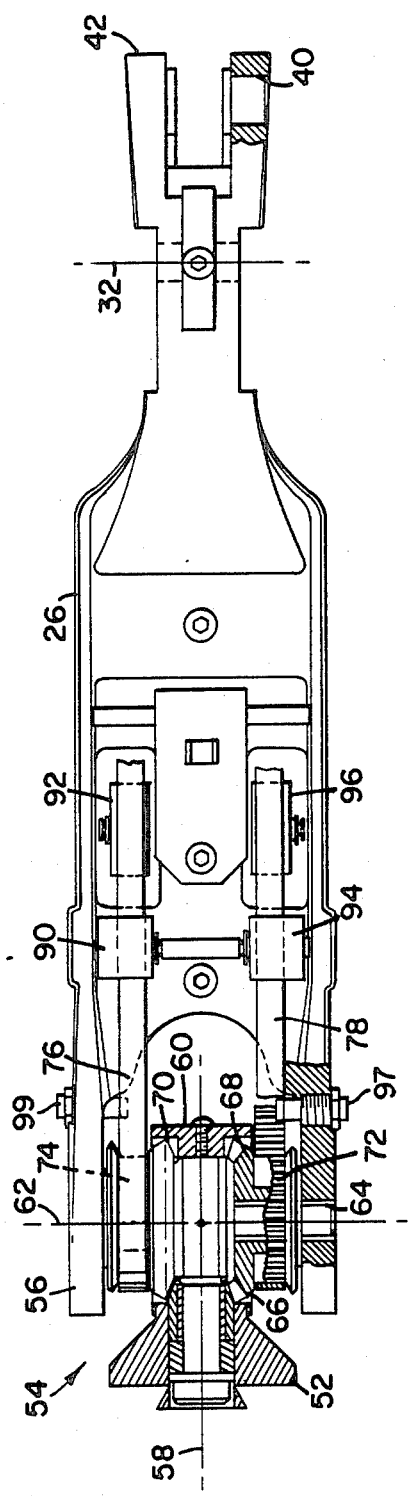
FIG. 11 is a top view (partially cutaway) of the upper arm of the articulated arm assembly.

The articulated arm assembly 12 includes two independently pivotal arms. Referring primarily to FIGS. 10 and 11, the upper arm 26 is connected by a pin 28 to the lower arm 30 for pivotal movement about a lateral axis 32 in the same plane. Pairs of standoffs 34 and 36 are provided on the lower arm 30 for supporting covers 22, which have been omitted from FIGS. 10 and 11 for clarity. A pair of openings 38 and 40 are provided in the inner or elbow portion 42 of the upper arm 26 for connection to a linear actuator. Similarly, a plurality of openings 44, 46, and 48 are provided in the inner or shoulder portion 50 of the lower arm 30 for connection to another linear actuator, as will be explained more fully hereinafter.

A tool adaptor 52 is supported by a wrist assembly 54 at the outer end 56 of the upper arm 26 for rotational movement about a pair of generally perpendicular axes. In particular, the adaptor 52 is mounted for rotation on a pin about the longitudinal axis 58 of a housing 60. The housing 60 in turn is supported for rotation about the axis 62 of a lateral pin 64. A pinion gear 66 is secured to the adaptor 52. The pinion gear 66 is engaged between an opposing pair of bevel gears 68 and 70 supported for independent rotation about axis 62 on opposite sides of the housing 60. A toothed roller 72 is secured to the bevel gear 68. Similarly, another toothed roller 74 is secured to the other bevel gear 70.

It will thus be appreciated that the wrist assembly 54 provides for pitch-and-roll control of the tool adaptor 52 about axes 58 and 62. When rollers 72 and 74 are driven in the same direction, the pinion gear 66 is stationary relative to the bevel gears 68 and 70 such that the tool adaptor 52 pitches upwardly or downwardly about the lateral axis 62. Differential drive of the rollers 72 and 74 causes the tool adaptor 52 to roll in either direction about the longitudinal axis 58. Axes 32, 58, and 62 comprise three of the five control axes of the robot 10.

The rollers 72 and 74 are connected by toothed timing belts 76 and 78 to a corresponding pair of toothed rollers 80 and 82 supported for rotation about axis 32 at the upper end 84 of the lower arm 30. The inner roller 80 is secured for rotation with a corresponding outer drive roller 86. Similarly, the other inner drive roller 82 is secured for rotation with a corresponding outer drive roller 88. Rollers 80 and 86 and rollers 82 and 88 in effect thus comprise dual pulleys which are supported for rotation about a common axis 32. A pair of fixed idler rollers 90 and an adjustable pivotal idler roller 92 are preferably provided on the upper arm 26 for maintaining proper tension in the timing belt 76. A similar arrangement of fixed idler rollers 94 and an adjustable pivotal idler roller 96 are provided for the belt 78.

Figure 8:
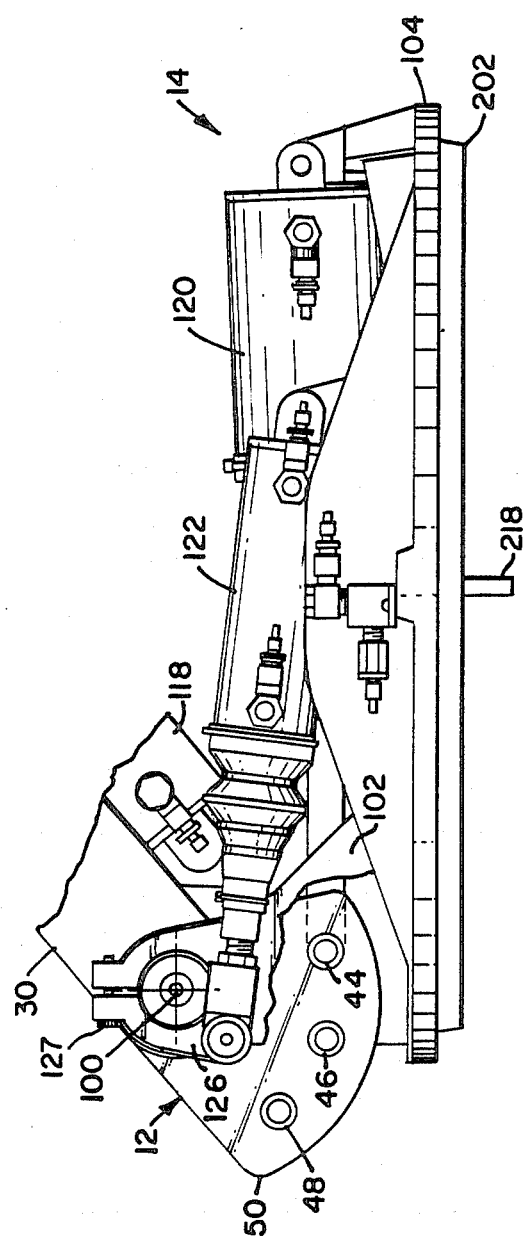
FIG. 8 is a side view of the turntable assembly and the lower portion of the articulated arm assembly.
Figure 9:
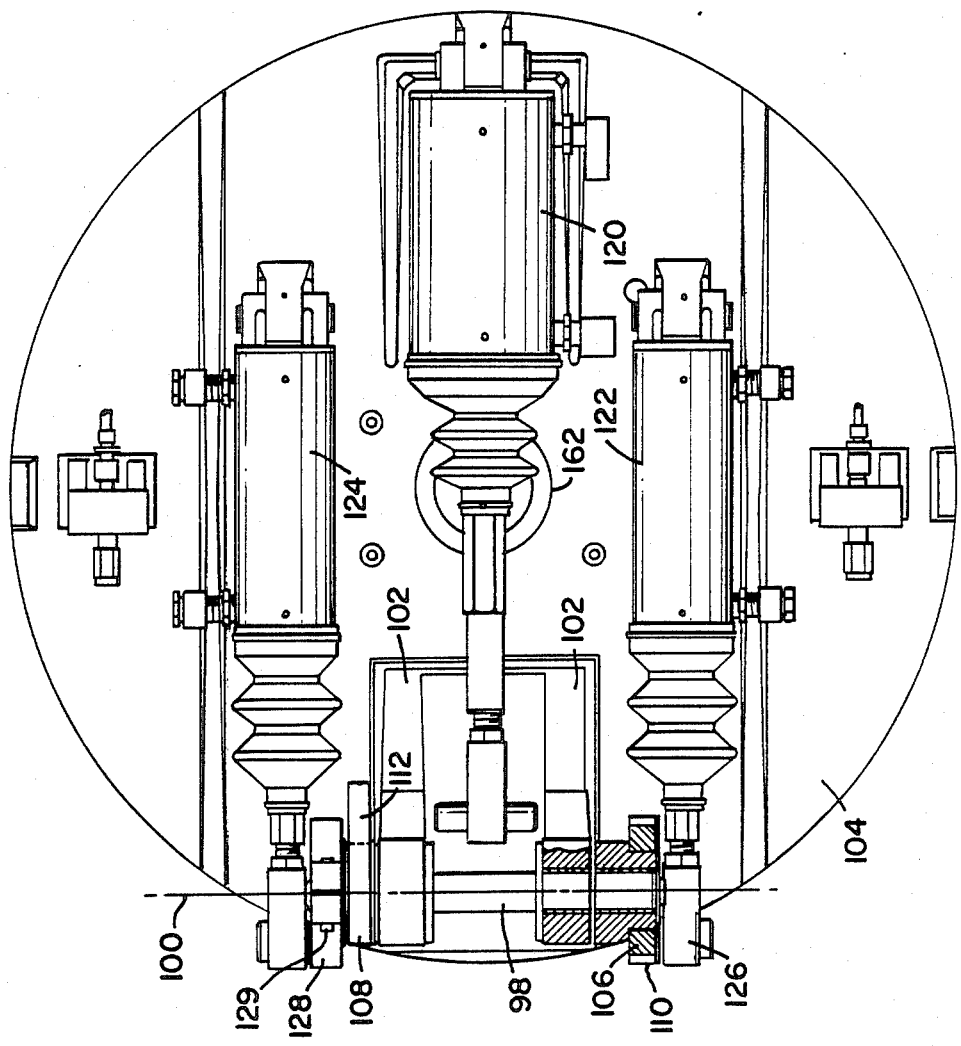
FIG. 9 is a top view of FIG. 8.

The lower arm 30 of the articulated arm assembly 12 is pivoted to the turntable assembly 14. Referring to FIGS. 8 and 9, the lower arm 30 is connected by pin 98 to the turntable assembly 14 for pivotal movment about another lateral axis 100. Axis 100 comprises the fourth control axis of the robot 10. The pin 98 extends between a pair of lugs 102 on a plate 104. A pair of drive rollers 106 and 108 are supported on pin 98 for independent rotation about the common axis 100. The drive roller 106 is connected by a timing belt 110 to roller 86 on the lower arm 30. Similarly, the drive pulley 108 is connected by a timing belt 112 to roller 88 on the lower arm 30. Adjustable pivotal idler rollers 114 and 116 are preferably provided on the lower arm 30 for proper tensioning of belts 110 and 112, respectively. A regulator 117 is located on the lower arm 30 for controlling fluid pressure to the gripper 20 mounted on adaptor 52.

The upper arm 26 of the articulated arm assembly 12 is pivoted relative to the lower arm 30 by a linear actuator 118 selectively coupled between the lower arm and one of the two pin openings 38 and 40 provided in the inner end or elbow portion 42 of the upper arm. Pivotal movement of the lower arm 30 relative to the turntable assembly 14 is controlled by another linear actuator 120 selectively coupled between plate 104 and one of the pin connections 44, 46, or 48 located in the inner end or shoulder portion 50 of the lower arm.

The use of multiple pin connections for coupling actuators 118 and 120 to arms 26 and 30 of assembly 12 comprises a significant feature of the invention. This facilitates adjustment of the work envelope of robot 10 at any rotational position of turntable assembly 14, depending upon the particular combination of connection points selected. FIG. 12 shows the operating envelopes possible with two pin connection points on arm 26, and three pin connection points on arm 30. Connection at openings 40 and 44 results in envelope A. Connection at openings 40 and 46 results in envelope B. Connection at openings 40 and 48 results in envelope C. Connection at openings 38 and 44 results in envelope D. Connection at openings 38 and 46 results in envelope E. Connection at openings 38 and 48 results in envelope F.

Actuation of the wrist assembly 54 is controlled by other linear actuators 122 and 124 coupled between plate 104 and cranks 126 and 128 secured to drive rollers 106 and 108, respectively. As illustrated, cranks 126 and 128 take the form of clamp-type collars secured by screws 127 and 129 to pin 98, to which rollers 106 and 108 are also secured. This comprises a significant feature because it enables orientation of the adaptor 52, both in pitch and roll, to be present and adjusted as desired.

In the preferred embodiment, actuators 118, 120, 122, and 124 comprise double-acting fluid cylinders having non-servo characteristics. Flow controls (not shown) are preferably provided in the connections to each cylinder so that the velocities during extension and retraction can be adjusted as desired. If desired electrical actuators or other forms of servo-type actuators can be substituted for cylinders in adapting the robot 10 for use as a servo device. This also comprises a significant feature of the invention.

It will thus be apparent that the articulated arm assembly 12 incorporates four degress of independent rotational freedom about axes 32, 58, 62, and 100. Since belts 76, 78, 110, and 112 are supported for rotation about the pivotal axes 32 and 100 of the articulated arm assembly 12, it will also be appreciated that this serves the function of a pantograph linkage so that the tool adaptor 52, after initial adjustment via cranks 126 and 128, is maintained in constant angular orientation during movement of arms 26 and 30 unless overridden by the wrist actuators 122 and 124. This too comprises an important feature of the present invention.

Figure 3:
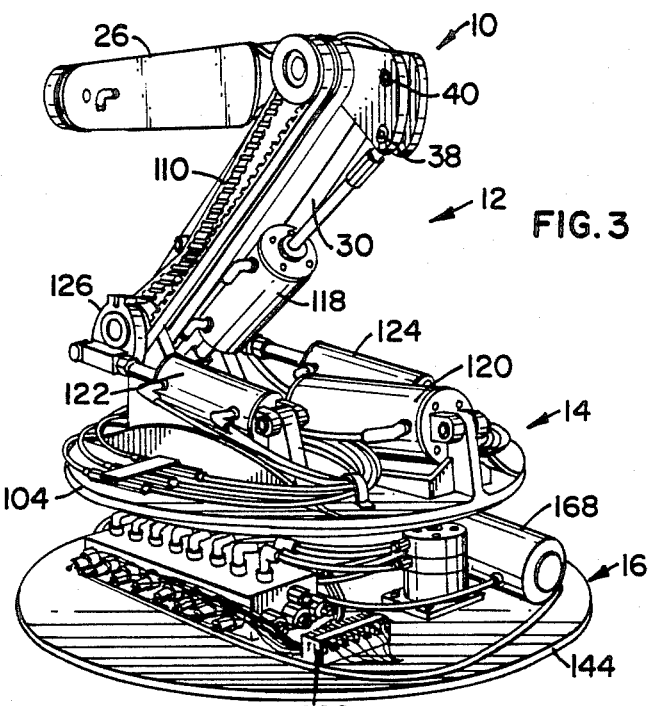
FIG. 3 is a perspective view of the robot without protective covers.
Figure 4:
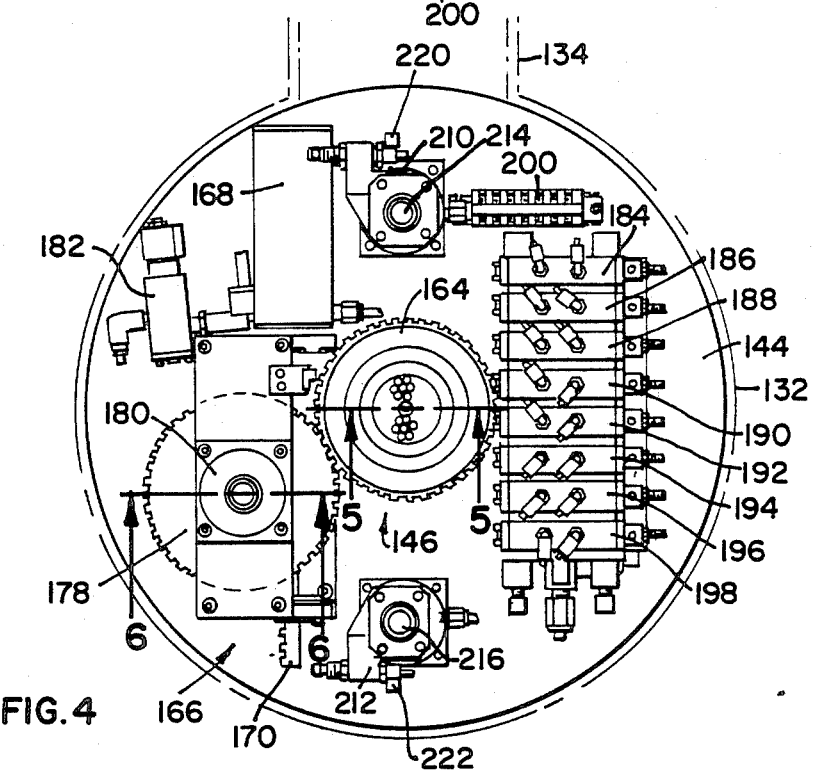
FIG. 4 is a horizontal sectional view of the stationary base assembly taken along lines 4—4 of FIG. 3 in the direction of the arrows.

The turntable assembly 14 is supported by the base assembly 16 for rotation about an upright axis 130, which comprises the fifth control axis of the robot 10. Referring to FIGS. 1, 3, and 4, the base assembly 16 includes an enclosure 132 with a control panel 134 provided on one side thereof, preferably opposite the 180° arc over which the turntable assembly 14 can be positioned. The control panel 134 contains the microprocessor controller and associated components and controls for operating and programming the robot 10. Various fittings and plugs are provided on the outside of the control panel 134 for connection to suitable power supplies and the like. A fitting 136 is for connection to a supply of fluid under pressure when the linear actuators comprise double-acting cylinders. An electrical supply plug 138 and on/off switch 140 are also provided, together with a plug 142 for connection to a suitable input/output device.

Various other components are located within the enclosure 132 on a support plate 144. In particular, referring now to FIG. 5, the base plate 104 of the turntable assembly 14 is mounted for rotation about axis 132 on a support assembly 146. The support assembly 146 comprises a main casting 148 secured by bolts 150 or other suitable fasteners to the base plate 144. A hub 152 is supported by bearings 154 and 156 for rotation about the main casting 148. The bearings 154 and 156 are secured in place between a shoulder on the main casting 146 and an upper retainer ring 158 by bolts 160. A seal 161 is provided between the hub 152 and retainer ring 158. Suitable access openings are provided below hub 152 in the main casting 148 and through the center thereof so that the necessary lines and connections can be extended through a central opening 162 in the turntable assembly 14, which plate is bolted directly to hub 152. A gear 164 is also secured to the hub 152.

The gear 164 of the support assembly 146, and thus the turntable assembly 14 supported thereon, are driven for rotation by a drive assembly 166. Referring primarily to FIGS. 4 and 6, the drive assembly 166 includes a linear actuator 168 coupled to a rack 170 in engagement with a pinion gear 172 secured to a shaft 174. The shaft 174 is journaled for rotation in a casting 176 secured to the base plate 144. A drive gear 178 which is engaged with the gear 164, is also secured to the shaft 174 for rotation responsive to the actuator 168.

In accordance with the preferred construction, an optical encoder 180 of the pulse-type is also secured to shaft 174 for sensing rotational positioning and velocity. For example, the encoder 180 can comprise a Hewlett-Packard model HEDS-6000 two channel optical encoder unit. The brake system of robot 10 is responsive to encoder 180 for rotational positioning of the turntable assembly 14 at either extreme, or at least one intermediate point, of the arc travel, as will be explained more fully below. For this reason, robot 120 is a hybrid device because the encoder 180 provides feedback positioning control about axis 132. This comprises another significant feature of the invention.

The enclosure 132 of the base assembly 16 further includes various valves for controlling operation of the actuators of robot 10. The fluid supply fitting 136 is connected to a main-line valve 182 which in turn is connected to solenoid valves 184, 186, 188, 190, 192, 194, 196 and 198 adapted for controlling the various actuators of the robot. For clarity, the various lines connecting the solenoid valves and actuators have been omitted. A terminal strip 200 is provided for interfacing the solenoid valves 184 through 198 with the microprocessor controller (not shown) within the control panel 134.

The articulated arm assembly 12 and turntable assembly 14 of the robot 10 are adapted for positioning at 45° intervals between 0° and 180°. Referring primarily to FIGS. 4 and 7, a ring 202 is secured to the underside of the base plate 104 of the turntable assembly 14. The ring 202 includes three openings 204, 206, and 208 adapted for cooperation with brake shoes controlled by linear actuators mounted within the enclosure 132 of the base assembly 16. In particular, two linear actuators 210 and 212 are provided in diametrically spaced-apart relationship. The actuators 210 and 212 can comprise, for example, flat double-acting fluid cylinders coupled to brake shoes 214 and 216, respectively, for movement into and out of engagement with the brake ring 202. The brake shoes 214 and 216 each include a central raised portion of brake material for engaging the ring 202, and a rigid surrounding portion for engaging one of the openings 204, 206, or 208 to secure the turntable assembly 14 in the desired intermediate rotational position. The actuator 210 and brake shoe 214 cooperate with opening 208 in ring 202 for the 90° stop position. The actuator 212 and brake shoe 216 cooperate with openings 204 and 208 to define the 45° and 135° stop positions. the 0° and 180° extremes are defined primarily by the stroke positions of actuator 168, with one or both brake shoes 214 and 216 engaged against ring 202.

A mechanical stop 218 is also secured to the underside of the base plate 104 of the turntable assembly 14. The stop 218 on the turntable assembly 14 cooperates with a pair of diametrically-opposed stops 220 and 222 on the enclosure 132 of the base assembly 16 to prevent the upper portion of the robot 10 from swinging about too far.

From the foregoing, it will thus be apparent that the present invention comprises an improved hybrid robot having numerous advantages over the prior art. The robot herein is essentially a non-servo device of the pick-and-place type but which incorporates an articulated arm and positional feedback about one control axis for extended flexibility and capability of upgrade to a full servo device. The multiple selective pin connections between the inner and outer arm actuators of the articulated arm assembly facilitate adjustment of the operating envelope. The robot herein has five axes of freedom and can easily be upgraded for even more flexibility by substituting servos for cylinders as the actuators. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any equivalents, modifications, rearrangements, and/or modifications of elements falling within the scope of the invention as defined by the following claims.

What is claimed is:

1. A robot with a mechanically programmable operating envelope, which comprises:
   a base plate;
   a lower arm having an inner end connected to said base plate for pivotal movement about a first transverse axis, and an outer end;
   an upper arm having an inner end connected to the outer end of said lower arm for pivotal movement about a second transverse axis generally parallel to the first axis, and an outer end;
   a tool adaptor;
   wrist means connecting said tool adaptor to the outer of said upper arm for pivotal movement about a third transverse axis and a fourth longitudinal axis, which third and fourth axes are mutually perpendicular;
   a first linear actuator selectively coupled between one point in said lower arm and one of a plurality of predetermined spaced-apart points in said upper arm, depending upon the operating envelope desired, for effecting pivotal movement of said upper arm about the second axis relative to said lower arm;
   a second linear actuator selectively coupled between one point in said base plate and one of a plurality of predetermined spaced-apart points in said lower arm, depending upon the operating envelope desired, for effecting pivotal movement of said lower arm about the first axis relative to said base plate;
   pantograph means extending about the first, second and third transverse axes and interconnecting said lower arm, said upper arm, and said wrist means for maintaining substantially constant orientation of said adaptor upon pivotal movement of said lower and upper arms about said first and second transverse axes, respectively; and
   third and fourth linear actuators connected between said base plate and said pantograph means for independently effecting pivotal movement of said adaptor about the third and fourth axes, respectively;
   said pantograph means comprising:
     a pair of first rollers mounted for independent rotation about the first transverse axis;
     a pair of cranks, each crank adjustably secured to one of said first rollers, one crank being coupled to said third linear actuator and the other crank being coupled to the fourth linear actuator;
     a pair of second rollers mounted for independent rotation about the second transverse axis;
     a pair of first endless belts interconnecting corresponding first and second rollers;
     a pair of third rollers mounted for independent rotation about the second transverse axis, each third roller being secured for rotation with the corresponding second roller;
     a pair of fourth rollers coupled to said wrist means and mounted for independent rotation about the third transverse axis; and
     a pair of second endless belts interconnecting corresponding third and fourth rollers.

2. The robot of claim 1, wherein two circumferentially spaced-apart openings at a predetermined radius from the second axis are provided in said upper arm for selective connection to said first linear actuator.

3. The robot of claim 1, wherein three circumferential spaced-apart openings at a predetermined radius from the first axis are provided in said lower arm for selective connection to said second linear actuator.

4. The robot of claim 1, wherein said first, second, third, and fourth actuators each comprises a double-acting fluid cylinder.

5. The robot of claim 1, further including:
   means for supporting said base plate for rotation about a fifth axis;
   drive means including a fifth linear actuator for effecting rotation of said base plate over a predetermined arc about said fifth axis;
   means connected to said drive means for sensing rotational positioning of said base plate; and means responsive to said sensing means for selectively locking said base plate at either extreme of the arc and at least one predetermined intermediate position between the extremes of travel of said base plate.

6. A robot with a mechanically programmable operating envelope, which comprises:
   a base plate;
   a lower arm having an inner end connected to said base plate for pivotal movement about a first axis, and an outer end;
   an upper arm having an inner end connected to the outer end of said lower arm for pivotal movement about a second axis generally parallel to the first axis, and an outer end;
   a tool adaptor;
   wrist means connecting said tool adaptor to the outer end of said upper arm for pivotal movement about a third axis and a fourth axis, which third and fourth axes are mutually perpendicular;
   a first linear actuator selectively coupled between one point in said lower arm and one of one or more predetermined spaced-apart points in said upper arm, depending upon the operating envelope desired, for effecting pivotal movement of said upper arm about the second axis to said lower arm;
   a second linear actuator selectively coupled between one point in said base plate and one of a plurality of predetermined spaced-apart points in said lower arm, depending upon the operating envelope desired, for effecting pivotal mvoement of said lower arm about the first axis relative to said base plate;
   pantograph means extending about the first, second and third axes and interconnecting said lower arm, said upper arm, and said wrist means for maintaining substantially constant orientation of said adaptor upon pivotal movement of said lower and upper arms about said first and second axes, respectively;
   third and fourth linear actuators connected between said base plate and said pantograph means for independently effecting pivotal movement of said adaptor about the third and fourth axes, respectively;
   means for supporting said base plate for rotation about a fifth axis;
   drive means including a fifth linear actuator for effecting rotation of said base plate over a predetermined arc about said fifth axis;
   means connected to said drive means for sensing rotational positioning of said base plate; and
   means responsive to said sensing means for selectively locking said base plate at either extreme of the arc and at least one predetermined intermediate position between the extremes of travel of said base plate;

said pantograph means comprising:
- a pair of first rollers mounted for independent rotation about the first transverse axis;
- a pair of cranks, each crank adjustably secured to one of said first rollers, one crank being coupled to said third linear actuator and the other crank being coupled to the fourth linear actuator;
- a pair of second rollers mounted for independent rotation about the second transverse axis;
- a pair of first endless belts interconnecting corresponding first and second rollers;
- a pair of third rollers mounted for independent rotation about the second transverse axis, each third roller being secured for rotation with the corresponding second roller;
- a pair of fourth rollers coupled to said wrist means and mounted for independent rotation about the third transverse axis; and
- a pair of second endless belts interconnecting corresponding third and fourth rollers.

7. A robot with a mechanically programmable operating envelope, which comprises:
- a base plate;
- a lower arm having an inner end connected to said base plate for pivotal movement about a first axis, and an outer end;
- an upper arm having an inner end connected to the outer end of said lower arm for pivotal movement about a second axis generally parallel to the first axis, and an outer end;
- a tool adaptor;
- wrist means connecting said tool adaptor to the outer end of said upper arm for pivotal movement about a third axis and a fourth axis, which third and fourth axes are mutually perpendicular;
- a first linear actuator selectively coupled between one point in said lower arm and one of a plurality of predetermined spaced-apart points in said upper arm, depending upon the operating envelope desired, for effecting pivotal movement of said upper arm about the second axis relative to said lower arm;
- a second linear actuator selectively coupled between one point in said base plate and one of one or more predetermined spaced-apart points in said lower arm, depending upon the operating envelope desired, for effecting pivotal movement of said lower arm about the first axis relative to said base plate;
- pantograph means extending about the first, second and third axes and interconnecting said lower arm, said upper arm, and said wrist means for maintaining substantially constant orientation of said adaptor upon pivotal movement of said lower and upper arms about said first and second axes, respectively;
- third and fourth linear actuators connected between said base plate and said pantograph means for independently effecting pivotal movement of said adaptor about the third and fourth axes, respectively;
- means for supporting said base plate for rotation about a fifth axis;
- drive means including a fifth linear actuator for effecting rotation of said base plate over a predetermined arc about said fifth axis;
- means connected to said drive means for sensing rotational positioning of said base plate; and
- means responsive to said sensing means for selectively locking said base plate at either extreme of the arc and at least one predetermined intermediate position between the extremes of travel of said base plate;

said pantograph means comprising:
- a pair of first rollers mounted for independent rotation about the first transverse axis;
- a pair of cranks, each crank adjustably secured to one of said first rollers, one crank being coupled to said third linear actuator and the other crank being coupled to the fourth linear actuator;
- a pair of second rollers mounted for independent rotation about the second transverse axis;
- a pair of first endless belts interconnecting corresponding first and second rollers;
- a pair of third rollers mounted for independent rotation about the second transverse axis, each third roller being secured for rotation with the corresponding second roller;
- a pair of fourth rollers coupled to said wrist means and mounted for independent rotation about the third transverse axis; and
- a pair of second endless belts interconnecting corresponding third and fourth rollers.

* * * * *